United States Patent [19]
Fischer

[11] 3,772,785
[45] Nov. 20, 1973

[54] COMBINATION TRIMMING AND CUTTING TOOL

[75] Inventor: William Arthur Fischer, Greenville, S.C.

[73] Assignee: Commercial Affiliates Inc., New York, N.Y.

[22] Filed: July 1, 1971

[21] Appl. No.: 158,679

[52] U.S. Cl. .................................................. 30/293
[51] Int. Cl. ............................................. B26b 29/00
[58] Field of Search ................ 30/2, 286, 287, 289, 30/293, 294, 330

[56] References Cited
UNITED STATES PATENTS

| | | | |
|---|---|---|---|
| 2,065,761 | 12/1936 | Smith | 30/293 |
| 3,581,397 | 6/1971 | Kochanowski | 30/293 |
| 2,067,986 | 1/1937 | Schmidt | 30/2 |
| 2,068,020 | 1/1937 | Grounds | 30/2 |
| 1,211,777 | 1/1917 | Stanfield | 30/287 X |
| 3,482,310 | 12/1969 | Paterson | 30/293 |

Primary Examiner—Othell M. Simpson
Attorney—Edward Halle

[57] ABSTRACT

A convertible edge trimming and cutting tool with a body portion including a base plate having surface bearing means and edge guide means to guide the edge trimming operation of the tool, and a blade holding plate movable with relation to the base plate, so that a cutting blade attached to the blade holding plate may be extended beyond the guiding edge of the base plate to perform a cutting operation without the aid of the base plate guide.

11 Claims, 6 Drawing Figures

PATENTED NOV 20 1973 3,772,785

INVENTOR.
WILLIAM ARTHUR FISCHER
BY Edward Halle
ATTORNEY.

COMBINATION TRIMMING AND CUTTING TOOL

This invention relates to cutting tools, and in particular, to an edge trimming and cutting tool, and more particularly to an improved trimming and cutting tool which features a body portion having guide means and a cutter blade assembly which may be positioned selectively to operate in cooperation with the guide means of the body portion or independently thereof.

Although the tool of the invention can be adapted for many uses, it is particularly useful with carpeting adapted to be bonded to the floor after which excess material at the edge of the floor lying against a baseboard or lower part of the wall is trimmed, so that the carpeting may fit properly along the line of construction between the floor and the wall.

Thus, one of the principal objects is to provide a tool having guide means with which an operator may guide the blade of the tool to trim the edge of the carpet at the proper line. The tool must also be available for use as a regular cutting knife to cut pieces of carpet without the edge trimming feature so that a proper vertical cut, usually between two rows of tufts, can be made in the carpeting so that it can be properly sized for laying. Various tools of this type are known in the prior art such as the tool disclosed in United States Letters Patent No. 3,482,310 issued on application of William K. Paterson on Dec. 9, 1969.

It is another object of this invention to provide such a tool with a minimum of parts, with positive guide action for edge trimming and positive cutting action free from the trimming guide.

The objects of the invention are achieved with the device illustrated in the accompanying drawings in which.

Similar numerals refer to similar parts throughout the several views.

Figures 3, 4:
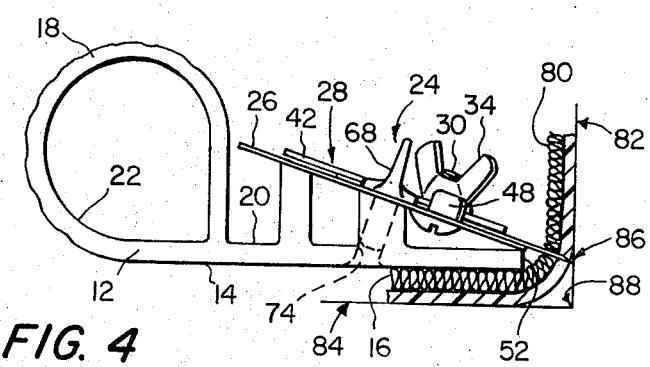
FIG. 3 is a top plan view similar to FIG. 2 with the cutter blade assembly in extended position.
FIG. 4 is an end elevation of the invention with the cutter blade assembly in retracted position similar to that shown in FIG. 2.

The combination tool 10 of the invention comprises a main body portion 12 which has a bottom 14 adapted to be used as bearing means to guide the tool over the surface of a material to be trimmed such as a carpet 16 as shown in FIG. 4. It is, therefore, preferable to have the bearing means 14 of the body portion 12 in a unitary flat plane. The main body portion 12 should also have hand grip means such as means 18 for ease in handling the tool. The hand grip means 18 should have a grip portion so that the tool can be grasped in either the right or left hand of the operator.

It has been determined that a simple base plate 20 having a curved edge 22 can be formed into an integral body portion comprising the bearing means 14 and the hand grip means 18. The tool also has a cutter blade assembly 24 comprising a cutter plate 26 and blade holding means 28 comprising means to selectively hold the cutter blade in fixed positions comprising pivot means such as a stud 30 integral with or connected to the plate 26 having a threaded portion 32 to which a wing nut fastening means 34 is threaded. The blade 36 is provided with a slot 38 and sharp edges 40. Blade retaining and shielding means such as a plate 42 having a slot 44 and an end taper 46 complete the blade holder. Blade positioning means such as stop means 48 and 50 are provided so that the blade holding means 28 can be positioned both for left and right hand cuts. Blade 36 can be extended to and fixed at selected positions by tightening and loosening wing nut 34.

The body portion 12 also has an edge trimming guide means 52 in the form of a straight edge as illustrated. While a straight edge is preferred in the tool of the invention, the guide means 52 may take any convenient form so long as there are at least two points along its length which will serve to position the guide means as well as the entire tool with relation to the edge of a piece of material to be trimmed in accordance with the teachings of the invention.

Figure 2:
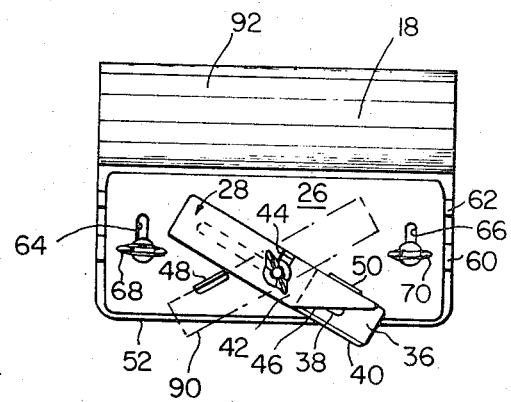
FIG. 2 is a top plan view with the cutter blade assembly in retracted position, with dotted lines indicating alternate positioning of the parts.

The cutter blade assembly plate 26 also has a guide edge 54 to which the blade holding assembly 28 is related. The cutter blade assembly plate 26 is adjustably secured to the body portion 12 by means of bracketing extension means 56 and 58 having edges 60 and 62 which are bevelled to hold the plate 26 firmly in various positions with edge 54 positioned relatively with relation to edge 52. There are two main positions which shall be called the retracted position as shown in FIG. 2 and the extended position as shown in FIG. 3. This positioning is accomplished by means of a pair of slots 64 and 66 which are placed in plate 26 to cooperate with threaded wing bolts 68 and 70 having studs 72 and 72a which are threaded into openings 74 and 76 respectively in bracket means portion 56. When wing bolts 68 and 70 are tightened with slots 64 and 66 in retracted position as shown in FIG. 2, the edge 54 of plate 26 will be retracted to a relative position slightly within the guide means of edge 52. Thus, when knife blade 36 is in extended position as shown in FIGS. 2 and 4, it will cut along a line determined by the angle of plate 26 relative to bearing means 14 and the guide means 52 of body portion 12.

It is to be noted in FIG. 4 that when the tool is placed against a piece of carpeting 16 having an edge 80 overlapping against a vertical wall base 82, the guide means 52 will position the tool along the juncture of wall base 82 and floor 84 and the angle formed by the plate 26 and the floor 84 will present the blade at a proper angle to make a trim cut so that a resulting cut edge of the carpet indicated at reference numeral 86 will fall into place in the corner of angle 88 formed between the floor 84 and the wall base 82.

Figure 5:
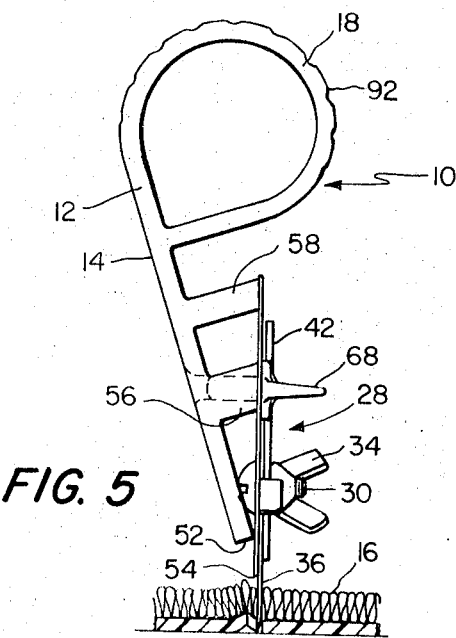
FIG. 5 is an end elevation showing the tool in use as a cutting tool with the cutter blade assembly in extended position similar to that shown in FIG. 3.
Figure 6:
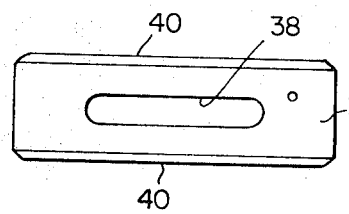
FIG. 6 is a plan view of a blade of the invention.

Referring now to FIGS. 3 and 5 of the drawings, it can be seen that plate 26 has been placed in extended position by loosening bolts 68 and 70, pulling the plate along slots 64 and 66 to extended position, and then retightening the bolts 68 and 70. This places edge 54 in a relative position outside of and beyond edge 52 effectively placing the blade 36 in a position free from the guide means of bearing surface 14 and edge 52. Thus, when the tool is grasped by the hand grip 18 as shown in FIG. 5, the blade extends independently of any guide means other than edge 54 of the plate 26. In this sense, the combination tool 10 is used as a cutting tool rather than a trimming tool, and a straight cut can be made on a piece of material such as a carpet to cut it to any desired size. The blade 36 and its edges 40 are held in proper position by the blade holding means 28 and the blade positioning means 48 and 50 as illustrated in the drawings as follows:

Blade 36 is placed on stud 30 by the slot positioning means 38. Then the wing nut 34 is threaded around stud 30. If it is desired to use the blade in the position shown in FIG. 2 of the drawings, the blade is placed with an edge 40 protruding over the edge 54 of plate 26 and the other edge 40 against blade positioning means 50. Then the blade holder and shield means 42 is positioned with its slot 44 facing toward hand grip 18 and its taper 46 facing edge 54. Slot 44 is then slid into the tool around stud 30 and underneath wing nut 34 and the wing nut is tightened. The blade 36 is then firmly held in position as shown in FIG. 2 with edge 40 extending downwardly along the right hand portion of edge 54.

Figure 1:
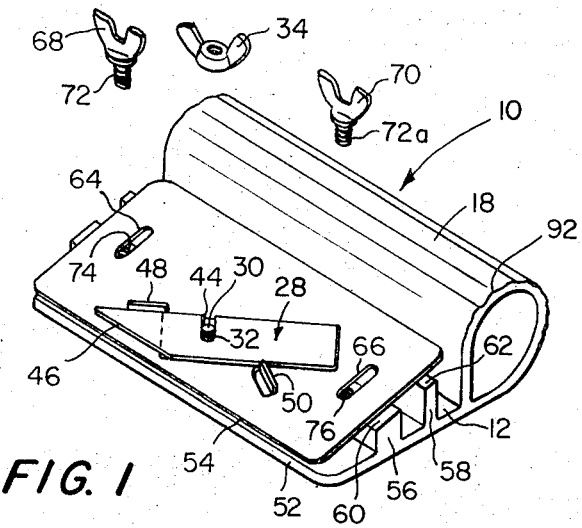
FIG. 1 is a perspective view with parts in exploded position.

The blade is reversed to a relatively left handed position as represented by the dotted lines, reference numeral 90 in FIG. 2, by loosening the wing nut 34, removing blade retaining and shielding means 42, moving blade 36 so that it is in position as shown in dotted lines 90, and then reversing and replacing blade retaining and shielding means 42 and tightening wing nut 34. The tool will then have the appearance as shown in FIG. 1 except that the blade 36 will be in extended position rather than in retracted position as depicted in FIG. 1. The blade, of course, may be extended or retracted merely by loosening the wing nut 34 and positioning the blade along its slot 38 relative to stud 30 and then tightening the nut at the desired position, either fully extended as shown in FIG. 3 or fully retracted as shown in FIG. 1.

Ridges or protuberances 92 may be provided on hand grip 18 for a surer grip. The tool may be made out of any suitable material such as a high impact plactic or a metal or any combination of materials. In the preferred form of the invention as illustrated, the tool is comprised essentially of four parts, the main body portion 12, the cutter blade assembly plate 26, the blade shield 42 and the blade 26. These parts are held together by simple fastening elements, and the parts may be arranged so that the tool may be used as a combination tool for either trimming purposes or cutting purposes in any number of positions.

While the tool has been described in its preferred form, there are many forms which it may take without departing from the spirit and scope of the invention, and it is, therefore, desired to be protected for all forms coming within the claims hereinbelow.

Wherefore I claim:

1. A combination trimming and cutting tool comprising a main body portion, comprising: bearing surface means including first edge guide means, and cutter blade assembly means including second mentioned edge guide means, said cutter blade assembly means being movably mounted in non-parallel relationship to the bearing surface means, together with adjustment means to position the second edge guide means between a retracted position and an extended position with relation to said first edge guide means.

2. The combination trimming and cutting tool as claimed in claim 1, in which the cutter blade assembly means is provided with a cutter blade and means to selectively hold the cutter blade in selected fixed positions with relation to said second edge guide means.

3. The combination trimming and cutting tool as claimed in claim 1, in which the bearing surface means comprises a substantially plane outer surface of the main body portion.

4. The combination trimming and cutting rool as claimed in claim 3, in which the main body portion further comprises mounting means positioned on a body portion opposite to said bearing surface means to position the cutter blade assembly at an angle to the bearing surface means.

5. The combination trimming and cutting tool as claimed in claim 4 which includes hand grip means having a grip surface with at least a portion positioned between the extended planes of the bearing surface means and the cutter blade assembly.

6. The combination trimming and cutting tool as claimed in claim 5, in which the mounting means for the cutter blade assembly comprises adjustable fastening means.

7. The combination trimming and cutting tool as claimed in claim 6, in which the cutter blade assembly is provided with a cutter blade and means to selectively hold the cutter blade in selected fixed positions with relation to said edge guide means.

8. The combination trimming and cutting tool as claimed in claim 2, in which the cutter blade assembly means comprises a movable plate and in which the second mentioned edge guide means are positioned in parallel edge offset relationship to the first mentioned edge guide means when in said retracted and extended positions.

9. The combination trimming and cutting tool as claimed in claim 8, in which the hand grip means comprises a grip portion with a partially cylindrical grip surface in which one portion of the grip surface is a continuation of the bearing surface means and another portion of the grip surface is intersected by the extended plane of at least one cutter blade.

10. The combination trimming and cutting tool as claimed in Claim 9, in which the means to selectively hold the cutter blade in selected fixed positions comprises pivot means, stop means and blade retaining plate means positioned to cooperate with a slotted blade together with releasable fastening means, in which the pivot means and a first stop means positions the blade at a first angle relative to the hand grip means, and the pivot means and a second stop means positions the blade at a second angle relative to the hand grip means.

11. The combination trimming and cutting tool as claimed in claim 10, in which the bearing surface means, the hand grip means, the first mentioned edge guide means, and at least one angled bracket forming at least a portion of the cutter blade assembly mounting means are formed integrally.

* * * * *